No. 785,312. Patented March 21, 1905.

UNITED STATES PATENT OFFICE.

JOHN WILLIAMS LANGLEY, OF CLEVELAND, OHIO.

PROCESS OF PURIFYING WATER.

SPECIFICATION forming part of Letters Patent No. 785,312, dated March 21, 1905.

Application filed July 25, 1904. Serial No. 218,102.

*To all whom it may concern:*

Be it known that I, JOHN WILLIAMS LANGLEY, a citizen of the United States, residing at Cleveland, in the county of Cuyahoga and State of Ohio, have invented or discovered certain new and useful Improvements in the Purification of Water, of which improvements the following is a specification.

My invention relates to the purification of water, and particularly acid waters which have their sources in volcanic springs, mines, &c., so as to render such waters adaptable to use for industrial purposes.

The pit-water coming from mines, for example, is generally highly acid and ferruginous owing to the presence in solution of sulfates of iron, alumina, magnesia, and other elements. It also frequently contains free sulfuric acid. Such water is ordinarily of a yellow-reddish color and forms a rusty reddish deposit chiefly composed of iron and aluminium hydrates. It is useless for any industrial purposes, since it corrodes pumps, pipes, boilers, &c. My purpose is to render this water usable in the boilers, pumps, &c., employed in mining, thus rendering unnecessary the drawing and piping of water from other sources, which has frequently been an item of great expense in mining operations. The water is also by the employment of my method of purification rendered adaptable to the quenching of coke, which is usually manufactured in proximity to coal-mines and for which it is not otherwise adapted.

Generally stated, my invention consists in the purification of such acid waters by rendering the same alkaline or neutral, thus precipitating the iron and other elements and neutralizing the free acid, and I accomplish this result by the treatment of the water first with a carbonate of calcium and then with lime.

In carrying out my said method of purification I first cause the water to flow through and be mixed with a broken or granular carbonate of calcium, preferably limestone. This may conveniently be accomplished by passing the water through tumbling-barrels or other agitating receptacles containing the limestone and provided with stirrers or loose masses or balls of metal in order to thoroughly mix the limestone with the water. The particular apparatus employed, however, is not material so long as the water is suitably subjected to the action of the limestone. By this step in my process the free acid and metallic salts in the water are to a large extent converted into salts of calcium and the metals are to a large extent precipitated as insoluble carbonates. For example, if the water contains free sulfuric acid and sulfates of iron, as is usually the case, the sulfuric acid unites for the most part with the limestone to form sulfate of calcium with the expulsion of carbonic acid, a part of which stays in solution and the remainder unites with the iron to form insoluble basic carbonates of iron and to some extent bicarbonates of iron in solution. Between this first step of my process and the final step of treatment with lime I prefer to mix air with the water in order to remove to a greater or less extent the free carbonic acid in solution. This intermediate step is not an essential one, but it materially facilitates the complete purification of the water and permits the use of a smaller quantity of lime than would otherwise be necessary for the final operation. To this end as the water is drawn or passes from the limestone tank or receptacle I subject it to a blast of air, or the same result may be accomplished by the passage of the water in thin streams from a higher level to a lower one. By this aerating operation the amount of free carbonic acid in solution is considerably reduced.

The final step consists in the mixture with the water of a quantity of quicklime or slaked lime, thereby removing the remaining portions of free carbonic acid and the metallic bicarbonates still in solution in the water. I prefer the use of slaked lime, and enough is added to render the water distinctly alkaline. This will cause the formation of a precipitate consisting of carbonate of calcium and insoluble metallic carbonates and hydrates, leaving a supernatant fluid which is chiefly a clear solution of sulfate of lime freed from iron, alumina, &c., and having practically none of the cutting or corroding qualities of the raw water. It can be used in iron pipes, pumps, and boilers without materially injuring them and is suitable for quenching coke and for other purposes to which the raw water was not adapted.

After the final treatment it is better, though not essential, that the water be passed into a separate settling-tank, or it may be filtered, if desired.

By the use of any suitable apparatus, a variety of forms of which are well known, the process may be performed continuously, or substantially so, water being passed through the limestone-tank in an unbroken stream and drawn off from a settling tank or reservoir, as may be desired.

The amount of the lime employed in the final operation will of course depend upon the character of the water to be purified. In the purification of a pit-water containing about .465 per cent. of sulfuric acid and from .2 per cent. to .4 per cent. of iron and alumina I have found the amount of limestone consumed to be about one per cent. of the weight of water and have successfully employed for the final operation from .1 per cent. to .2 per cent. of slaked lime. From this water I have thus removed all of the iron, alumina, &c., have neutralized and rendered harmless all of the free acid, and have reduced the combined acid about twenty-five per cent.

I am aware that lime has been previously used in the purification of water; but in such case the character of the water treated, the process employed, and the result have all been different than those herein referred to. Such prior processes have all been water-softening processes, where lime has been added in very small quantities in order to act upon bicarbonate of lime already in solution in the water, and thereby form insoluble carbonate of lime, which is precipitated and eliminated. Limestone has, however, never been used for such purposes and would be incapable of softening water. My process is in marked contrast to such prior processes, in that there is no attempt to soften the water to any material degree nor to eliminate lime. On the contrary, the purified water contains more lime than does the raw water. The result of my process is the purification of the acid waters above mentioned to an extent which will render them suitable for industrial purposes and for which in a raw state they are unfitted. To this end I precipitate the iron and other metals in the water, correct the acidity, and eliminate all corroding qualities; but the hardness or softness of the water and the presence or absence of lime are immaterial.

What I claim, and desire to secure by Letters Patent, is—

1. The process of purification of naturally-acid water, which consists in first mixing it with broken or granular carbonate of calcium, whereby it is partially purified, and then adding lime to obtain a neutral or alkaline reaction, substantially as described.

2. The process of purification of naturally-acid water, which consists in first subjecting it to the action of carbonate of calcium, whereby it is partially purified, and then adding lime in sufficient quantity to render the water alkaline, substantially as described.

3. The process of purification of acid water, which consists in first subjecting it to the action of carbonate of calcium, whereby it is partially purified, then to the action of air, and finally to the action of lime, substantially as described.

4. The process of purification of acid water, which consists in first mixing it with broken or granular carbonate of calcium, and then adding air and lime, substantially as described.

5. The herein-described process of purifying a natural water, which consists in first subjecting it to the action of carbonate of calcium, and then to the action of lime.

In testimony whereof I have hereunto set my hand.

JOHN WILLIAMS LANGLEY.

Witnesses:
  E. N. GUNSAULUS,
  R. L. SEWELL.